United States Patent
Matsumoto

(10) Patent No.: US 6,884,308 B2
(45) Date of Patent: Apr. 26, 2005

(54) METHOD OF MANUFACTURING MONOLITHIC CERAMIC ELECTRONIC PART AND MONOLITHIC CERAMIC ELECTRONIC PART

(75) Inventor: Hiroyuki Matsumoto, Izumo (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 10/256,138

(22) Filed: Sep. 27, 2002

(65) Prior Publication Data

US 2003/0062112 A1 Apr. 3, 2003

(30) Foreign Application Priority Data

Sep. 27, 2001 (JP) ........................................ 2001-295973
Aug. 23, 2002 (JP) ........................................ 2002-243234

(51) Int. Cl.[7] ........................... B32B 31/26; H01G 4/30; H01G 13/00
(52) U.S. Cl. ................. 156/89.16; 156/89.12; 156/89.14; 361/321.3; 428/210
(58) Field of Search ................... 156/89.12, 89.14, 156/89.16; 361/321.2, 321.3, 321.4, 321.5; 428/209, 210

(56) References Cited

U.S. PATENT DOCUMENTS

| | | | | |
|---|---|---|---|---|
| 5,646,081 A | * | 7/1997 | Nishiyama et al. | 501/138 |
| 5,659,456 A | * | 8/1997 | Sano et al. | 361/321.4 |
| 5,815,368 A | * | 9/1998 | Sakamoto et al. | 361/321.5 |
| 6,008,981 A | * | 12/1999 | Harada et al. | 361/321.4 |
| 6,160,472 A | * | 12/2000 | Arashi et al. | 338/21 |
| 2001/0006928 A1 | * | 7/2001 | Masuda | 501/138 |
| 2002/0013213 A1 | * | 1/2002 | Sato et al. | 501/139 |

FOREIGN PATENT DOCUMENTS

| | | | |
|---|---|---|---|
| EP | 0 043 157 | * | 1/1982 |
| EP | 0 737 655 | * | 10/1996 |
| JP | 3-112861 | * | 5/1991 |
| JP | 04-225208 | | 8/1992 |

OTHER PUBLICATIONS

Korean Office Action issued Sep. 8, 2004.

* cited by examiner

*Primary Examiner*—Melvin C. Mayes
(74) *Attorney, Agent, or Firm*—Dickstein, Shapiro, Morin & Oshinsky, LLP.

(57) ABSTRACT

In manufacturing a monolithic ceramic electronic part, an oxide of a conductive metal component contained in internal electrodes is mixed with a ceramic green sheet used for forming a ceramic layer by burning. Therefore, even if the conductive metal component diffuses and dissolves from the internal electrodes, the occurrence of non-uniformity in the concentration of the oxide of the conductive metal component is suppressed over the entire region of a laminate, and thus the entire laminate can be sufficiently uniformly sintered.

12 Claims, 5 Drawing Sheets

METHOD OF MANUFACTURING MONOLITHIC CERAMIC ELECTRONIC PART AND MONOLITHIC CERAMIC ELECTRONIC PART

BACKGROUND OF THE INVENTION

1. Field of the Invention

The present invention relates to a method of manufacturing a monolithic ceramic electronic part, and a monolithic ceramic electronic part. Particularly, the present invention relates to an improvement for making uniform a sintering degree of a laminate provided to a monolithic ceramic electronic part.

2. Description of the Related Art

An example of monolithic ceramic electronic parts concerned in the present invention is a monolithic ceramic capacitor. FIG. 1 is a sectional view showing a laminate 1 provided to a monolithic ceramic capacitor and is taken along line III—III in FIG. 2.

The laminate 1 comprises a plurality of laminated ceramic layers 2, and a plurality of internal electrodes 3 serving as internal conductor films extending along a plurality of interfaces between the respective ceramic layers 2 positioned in an intermediate portion in the lamination direction.

The laminate 1 is produced as follows.

First, a plurality of ceramic green sheets each containing a ceramic powder are prepared for forming the ceramic layers 2 by burning, and internal electrodes 3 are respectively formed on the ceramic green sheets used for the ceramic layers 2 positioned in the intermediate portion. The internal electrodes are respectively formed by, for example, printing conductive paste containing a conductive metal component on the ceramic green sheets.

Next, the plurality of ceramic green sheets are laminated to obtain a green laminate. In order to prepare the green laminate, ceramic green sheets for external layers, on each of which an internal electrode is not formed, are laminated on both lamination-direction ends of the laminate of the ceramic green sheets on which the internal electrodes 3 were respectively formed.

Next, the green laminate is burned to obtain the laminate 1 shown in FIG. 3.

As shown in FIG. 2, external electrodes 4 are formed on both ends of the laminate 1 to complete a desired monolithic ceramic capacitor 5. The ceramic green sheets for the ceramic layers 2 positioned between the respective internal electrodes 3 generally have the same composition as the ceramic green sheets used for the external layers. On the other hand, it is known that the conductive metal component contained in the internal electrodes 3 is partially oxidized, and diffuses and dissolves into the ceramic green sheets between the respective internal electrodes 3 and into the ceramic green sheets adjacent to the internal electrodes 3 during the step of burning the green laminate. Particularly, as the thickness of the ceramic layers 2 decreases, the oxide of the conductive metal component contained in the internal electrodes 3 readily diffuses to increase the oxide concentration in each of the portions between the respective internal electrodes 3.

The concentration of the oxide of the conductive metal component influences the characteristics of the monolithic ceramic capacitor after burning. In order to decrease the influence, the composition of the ceramic powder contained in the ceramic green sheets is appropriately controlled.

The distribution of the internal electrodes 3 in the laminate 1 is such that the internal electrodes 3 are formed in portions except at both ends 6 of the laminate 1 in the width direction and both ends of the laminate 1 in the lamination direction, i.e., in the external layer portions 7. Therefore, diffusion and dissolution of the conductive metal component contained in the internal electrodes 3 do not reach to both ends 6 of the laminate 1 in the width direction and the external layer portions 7, and thus the composition in these portions is different from the portions near the internal electrodes 3.

As a result, an insufficient sintering region 8, in which crystal grains are not grown, is formed at both ends 6 of the laminate 1 in the width direction and the external layer portions 7, as shown by oblique lines in FIG. 1.

It is more difficult to prevent the insufficient sintering region 8 from being formed in the external layer portions 7 than at both ends of the laminate 1 in the width direction. This is because the conductive metal component contained in the internal electrodes 3 can be sufficiently diffused to both ends 6 of the laminate 1 in the width direction by increasing the width of the internal electrodes 3, i.e., narrowing a margin where the internal electrodes 3 are not formed. However, the internal electrodes 3 cannot be formed in the external layer portions 7 at all.

In the insufficient sintering region 8, a sintering shrinkage does not sufficiently proceed, and thus stress occurs in the direction in which the laminate 1 is extended vertically as shown by arrows 9 in FIG. 1, or in the direction in which the laminate 1 is extended laterally.

Particularly, when vertical stress is applied to the laminate 1, slight peeling occurs between the internal electrodes 3 and the ceramic layers 2, thereby causing a defect in the insulating resistance of the monolithic ceramic capacitor 5 in some cases. In the extreme case, a larger amount of peeling, i.e., delamination, occurs.

Furthermore, moisture can enter the insufficient sintering region 8. Therefore, moisture enters the insufficient sintering region 8 during wet-polishing the laminate 1 after burning. In the next step of applying conductive paste containing, for example, copper, and baking the coating to form the external electrodes 4, therefore, the volume of the moisture entering the insufficient sintering region 8 becomes increased by the heating and acts to blow away a part of the laminate 1 or a part of the external electrodes 4. Consequently, a chip 10 occurs as shown in FIG. 2.

FIG. 3 is an enlarged sectional view showing the chipped portion 10 shown in FIG. 2. In FIG. 3, a form without the chip 10 is shown by dotted lines. As can be seen from a comparison between the form shown by the dotted line and the form shown by a solid line in FIG. 3, the chip 10 occurs in both a part of the laminate 10 and a part of the external electrodes 4. The chip 10 results in a failure of the appearance of the obtained monolithic ceramic capacitor 5.

Furthermore, beyond the moisture encountered in wet polishing, a plating solution used in wet plating and atmospheric moisture can possibly enter the insufficient sintering region 8. When the moisture, the plating solution or atmospheric moisture enters and accumulates in the insufficient sintering region 8, not only chip 10 occurs but also peeling between the internal electrodes 3 and the ceramic layers 2 occurs.

When sintering conditions are made severer by, for example, increasing the sintering temperature in order to sufficiently achieve sintering in the insufficient sintering region 8, the regions between the respective internal electrodes 3 are excessively sintered to increase the dielectric loss of the obtained monolithic ceramic capacitor 5 or cause the temperature characteristic of capacitance to deviate from a desired range, thereby causing an abnormality in electric characteristics.

Although problems with a monolithic ceramic capacitor are described above, the same problems possibly occur in monolithic ceramic electronic parts other than the monolithic ceramic capacitor.

SUMMARY OF THE INVENTION

Accordingly, it is an object of the present invention to provide a method of manufacturing a monolithic ceramic electronic part capable of resolving the above problems, and a monolithic ceramic electronic part obtained by the manufacturing method.

The present invention relates to a method of manufacturing a monolithic ceramic electronic part comprising a laminate comprising a plurality of laminated ceramic layers, and a plurality of internal conductor films respectively extending along the interfaces between the respective ceramic layers positioned in an intermediate portion in the lamination direction.

The method of manufacturing the monolithic ceramic electronic part comprises the step of preparing a plurality of ceramic green sheets each comprising a ceramic powder and used for forming a ceramic layer by burning, the step of forming an internal conductor film comprising a conductive metal component on each of the ceramic green sheets used as the ceramic layers positioned in the intermediate portion, the step of laminating the plurality of ceramic green sheets on which the internal conductor films are respectively formed, and laminating the ceramic green sheets used as external layers without the internal conductor films on and below the laminated ceramic green sheets with the internal conductor films respectively formed thereon, to form a green laminate, and the step of burning the green laminate.

In order to solve the above technical problems, each of the ceramic green sheets used as at least the external layers comprises an oxide of the conductive metal component contained in the internal conductor films.

In this way, when the oxide of the conductive metal powder contained in the internal conductor films is present in each of the ceramic green sheets, a predetermined amount of the oxide of the conductive metal component can be contained over the entire green laminate to decrease the difference in the concentration of the oxide of the conductive metal component between the vicinity of each of the internal conductor films and the other portion, thereby decreasing the difference in sintering degree.

The oxide of the conductive metal component may be contained only in the ceramic green sheets used as the external layers, or all ceramic green sheets according to the design of the monolithic ceramic electronic part, or the like.

The preferred concentration range of the oxide of the conductive metal component contained in each of the ceramic green sheets depends upon the type of the ceramic powder contained in each of the ceramic green sheets, the type of the conductive metal component, the distribution of the internal conductor films in the laminate, and the like. However, in general, the concentration of the oxide of the conductive metal component is preferably about 0.05% to 0.2% by weight based on the ceramic powder contained in each of the ceramic green sheets. nevertheless, the upper limit of the content of the oxide of the conductive metal component is selected within a range which causes no adverse effect on the electrical characteristics of the obtained monolithic ceramic electronic part.

In the method of manufacturing the monolithic ceramic electronic part of the present invention, the step of preparing the ceramic green sheets comprises the step of preparing a ceramic raw material, the step of burning the ceramic raw material to obtain the ceramic powder, the step of dispersing the ceramic powder in an organic vehicle to produce ceramic slurry, and the step of forming the ceramic slurry into a sheet to prepare the ceramic green sheets. In these steps, the oxide of the conductive metal component is preferably added in the step of preparing the ceramic slurry.

As the conductive metal component contained in the internal conductor films, for example, nickel is used. In this case, the oxide of the conductive metal component contained in the ceramic green sheets is added as, for example, a NiO powder.

The present invention also relates to a monolithic ceramic electronic part manufactured by the above-described manufacturing method.

Particularly, the present invention is advantageously applied to a monolithic ceramic capacitor. In this case, internal electrodes serving as the internal conductive films are formed in the laminate except at both ends of the laminate in the width direction, and at both ends of the laminate in the lamination direction, and external electrodes are formed on the outer surface of the laminate so as to be connected to the specified internal electrodes.

DESCRIPTION OF THE PREFERRED EMBODIMENTS

Figure 1:
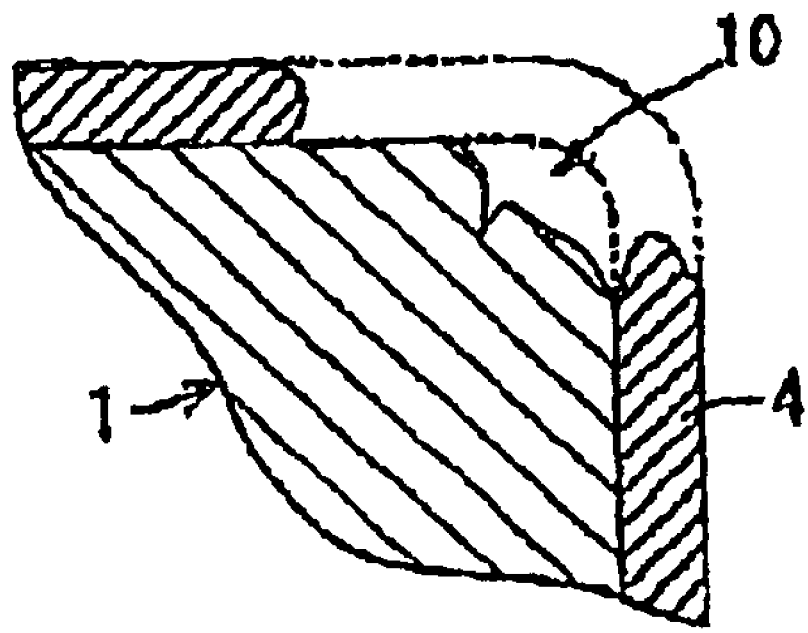
FIG. 1 is a sectional view showing a laminate I provided to a monolithic ceramic capacitor in order to solve the problems to be solved by the present invention.
Figure 4:
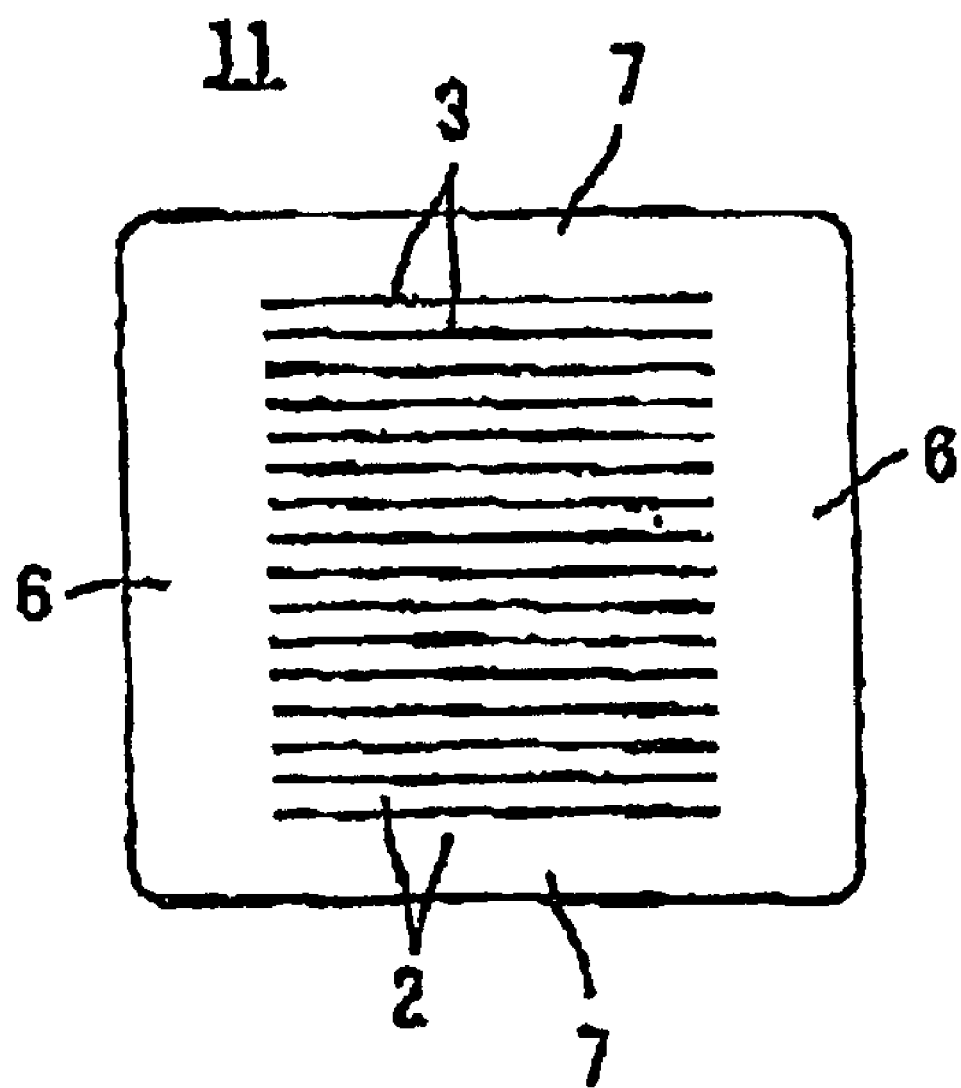
FIG. 4 is a sectional view showing a laminate for a monolithic ceramic capacitor according to an embodiment of the present invention.

FIG. 4 corresponds to FIG. 1, and is a sectional view showing a laminate 11 for a monolithic ceramic capacitor according to an embodiment of the present invention. In FIG. 4, components corresponding to those shown in FIG. 1 are denoted by the same reference numerals, and a duplicated description thereof is omitted.

In order to manufacture the laminate 11 shown in FIG. 4, a plurality of ceramic green sheets each comprising a ceramic powder and used for forming a ceramic layer 2 by burning are first prepared. Each of the ceramic green sheets contains about 0.05% to 0.2% by weight of an oxide of the conductive metal component contained in internal electrodes 3 based on the ceramic powder.

In further detail, the step of preparing the ceramic green sheets is performed as follows.

First, ceramic raw materials are prepared. When the intended ceramic powder is a $BaTiO_3$ ceramic powder, for example, a titanium oxide powder and barium oxide powder are prepared.

Next, the ceramic raw materials are mixed and dispersed, calcined and then ground. As a result, for example, the $BaTiO_3$ ceramic powder is obtained.

Next, the ceramic powder is mixed with an organic vehicle containing a solvent, a binder, a plasticizer, etc., and dispersed therein to prepare ceramic slurry. In the blending step for preparing the ceramic slurry, the oxide of the conductive metal component contained in the internal electrodes 3 is preferably added. When the conductive metal component contained in the internal electrodes 3 contains nickel, for example, a NiO powder is added in the blending step.

The oxide of the conductive metal component could be added, for example, in the step of calcining the ceramic raw material powder or by spraying on the ceramic green sheets. However, for the reasons below, the oxide is preferably added in the step of preparing the ceramic slurry.

First, the concentration of the oxide of the conductive metal component can easily be controlled at any time according to the thickness of the ceramic layers 2. For example, when the thickness of the ceramic layers 2 is increased, the difference in the diffusing amount of the conductive metal component contained in the internal electrodes 3 between a portion near each of the internal electrodes 3 and a portion apart from each of the internal electrodes 3 increases in each of the ceramic layers 2 between the respective internal electrodes 3. In such a case that the thickness of the ceramic layer 2 is increased, the added amount of the oxide of the conductive metal component is increased, so that non-uniformity of the concentration of the oxide of the conductive metal component in the ceramic layers 2 can be suppressed.

Secondary, burning is preferably started in a state in which the oxide of the conductive metal component is not contained in the crystal lattice of the ceramic powder obtained by calcination because an effect similar to diffusion and dissolution from the internal electrodes 3 can be expected from the oxide of the conductive metal component. When the oxide of the conductive metal component is added in the step of blending the ceramic raw materials before calcination, the diffusion and dissolution behavior of the added oxide of the conductive metal component is different from that of the conductive metal component contained in the internal electrodes 3 because the oxide of the conductive metal component is already contained in the ceramic powder after calcination. On the other hand, when the oxide of the conductive metal component is added in the step of preparing the ceramic slurry, the diffusion and dissolution behavior of the added oxide of the conductive metal component in the ceramic layers 2 is the same as when the conductive metal component previously contained in the internal electrodes 3, and the oxide and the conductive metal component can exhibit the same effect on crystal grain growth of the ceramic powder.

Third, the oxide of the conductive metal component can easily be uniformly dispersed in the ceramic slurry. When the oxide of the conductive metal component is sprayed on the ceramic green sheets, it is relatively difficult to uniformly spray the oxide.

Next, the ceramic slurry is formed into a sheet to prepare the ceramic green sheets.

After the plurality of ceramic green sheets are prepared as described above, the internal electrodes 3 containing the conductive metal are respectively formed on the ceramic green sheets used for the ceramic layers 2 positioned in the intermediate portion. The internal electrodes 3 are formed by, for example, printing conductive paste containing the conductive metal component on the ceramic green sheets.

Next, a plurality of ceramic green sheets are laminated to obtain a green laminate. In order to obtain the green laminate, the ceramic green sheets for the external layers without the internal electrodes formed thereon are laminated on both lamination-direction ends of the previously laminated ceramic green sheets with the internal electrodes 3 formed thereon.

Then, the green laminate is burned to obtain the laminate 11 after sintering. In the laminate 11, the oxide of the conductive component is previously contained in the ceramic green sheets used for the ceramic layers 2, and even when the conductive metal component diffuses and dissolves from the internal electrodes 3, non-uniformity in the concentration of the oxide of the conductive metal component in the laminate 11 can be suppressed as a whole. Therefore, it is possible to prevent the formation of the insufficient sintering region at both ends 6 in the width direction and in the external layers 7.

Next, the external electrodes 4 (refer to FIG. 2) are formed on the outer surface of the laminate 11 so as to be connected to specified internal electrodes 3 to complete the monolithic ceramic capacitor.

Although the oxide of the conductive metal component is contained in all ceramic green sheets in the above embodiment, the oxide of the conductive metal component may be contained only in the ceramic green sheets used for the external layers according to the area of the internal electrodes 3 in the laminate 11, i.e., a margin of the laminate 11.

A description will now be made of experimental examples carried out for recognizing the effect of addition of the oxide of the conductive metal component to the ceramic green sheets.

Experimental Example 1

A $BaTiO_3$ ceramic powder was prepared as a dielectric ceramic powder for a monolithic ceramic capacitor comprising internal electrodes containing nickel, with the capacitance at a reference temperature 20° C. changing in the range of −80% to +30% in the temperature range of −25° C. to +85° C.

An organic vehicle was added to the ceramic powder, and the ceramic powder was dispersed in the vehicle to prepare a ceramic slurry. In the step of preparing the ceramic slurry, three samples were prepared; one sample to which a NiO power was not added, one sample to which the NiO powder was added in an amount of 0.10% by weight based on the ceramic powder, and one sample to which the NiO powder was added in an amount of 0.20% by weight based on the ceramic powder.

Next, the ceramic slurry of each of the samples was formed into a sheet to form ceramic green sheets. Only the ceramic green sheets were laminated to prepare a green laminate having a size of 6 mm×5 mm ×1 mm.

Figure 5:
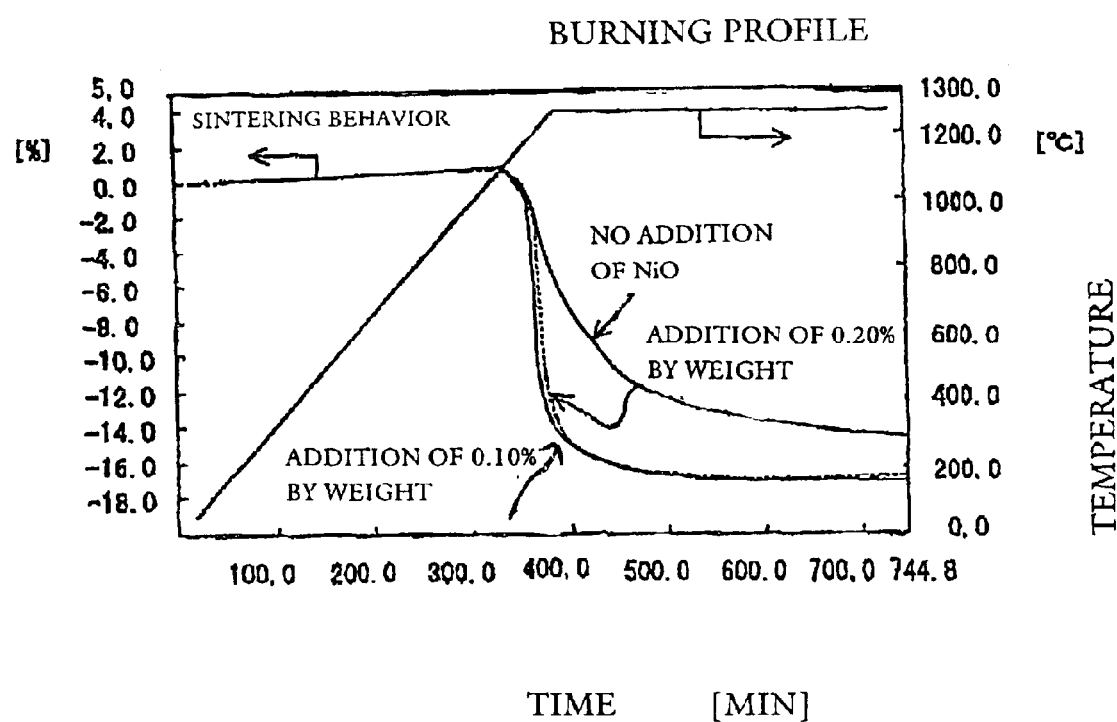
FIG. 5 is a diagram showing a burning profile and a sintering behavior in a step of burning a green laminate in Experimental Example 1 of the present invention.

Next, the green laminate of each of the samples was burned according to the burning profile shown in FIG. 5 to examine the sintering behavior of each sample by TMA analysis. FIG. 5 shows the sintering behavior of each sample and the burning profile represented by the expansion rate versus the burning time.

In FIG. 5, a comparison between "Addition of 0.10% by weight", "Addition of 0.20% by weight" and "No addition of NiO" indicates that by adding NiO, the expansion rate decreases early, i.e., contraction occurs early, to significantly improve the sintering degree.

Experimental Example 2

A ceramic slurry not containing a NiO powder, a ceramic slurry containing 0.05% by weight of NiO powder based on a ceramic power, and a slurry containing 0.10% by weight of NiO powder based on a ceramic power were prepared in the same manner as Experimental Example 1.

Next, ceramic green sheets were prepared by using each of the ceramic slurries, and an internal electrode containing nickel was formed on each of the ceramic green sheets. Then, the ceramic green sheets were laminated to obtain a green laminate, and the resultant green laminate was burned. Then, external electrodes were formed on the laminate to prepare a monolithic ceramic capacitor having the outside dimensions of 0.5 mm×0.5 mm×1.0 mm, and each of ceramic layers between the respective internal electrodes had a thickness of 8 $\mu$m.

Figure 2:
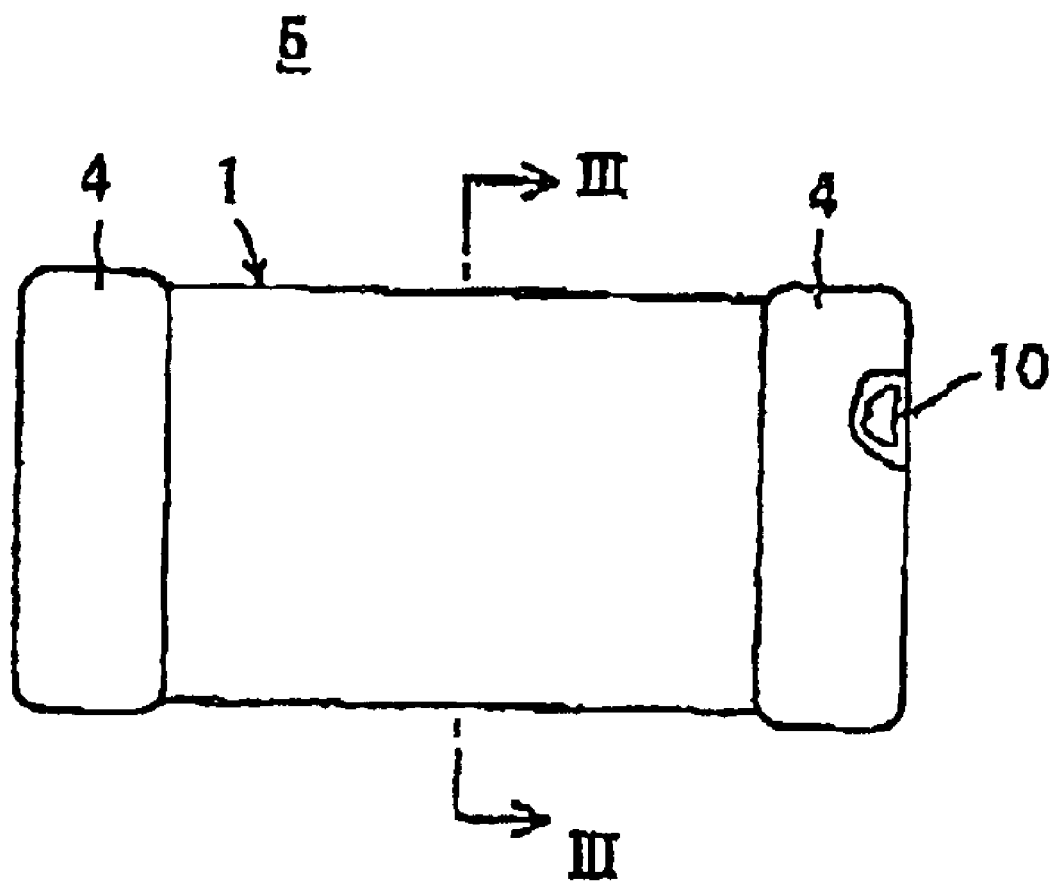
FIG. 2 is a front view showing the appearance of a monolithic ceramic capacitor manufactured by using the laminate shown in FIG. 1.
Figure 3:
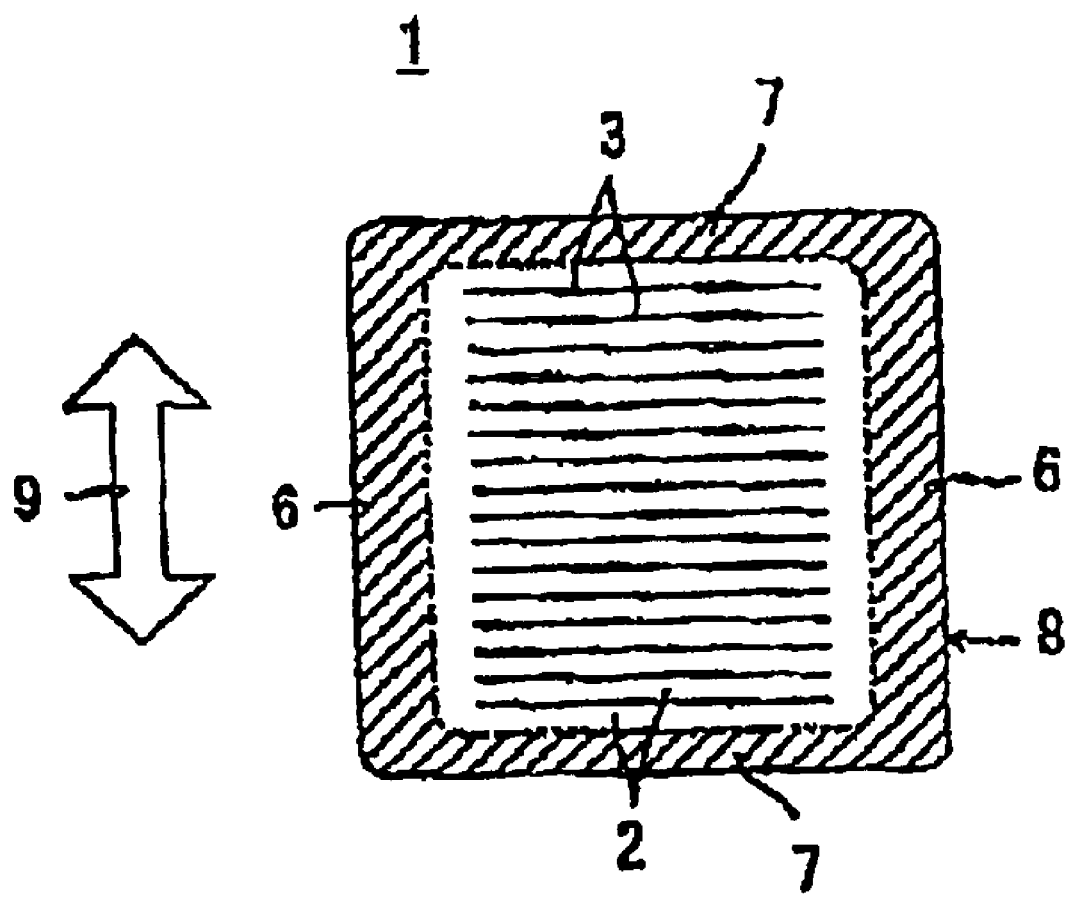
FIG. 3 is an enlarged sectional view showing the chipped portion of the monolithic ceramic capacitor shown in FIG. 2.

The appearance of the monolithic ceramic capacitor of each of the samples was observed to examine the presence of such a chip 10 as shown in FIGS. 2 and 3. The obtained results are shown in Table 1.

TABLE 1

| Adding amount of NiO (% by weight) | Occurrence ratio of chips (/100K) |
|---|---|
| 0 | 19 |
| 0.05 | 0 |
| 0.10 | 0 |

Table 1 indicates that the sample using the ceramic slurry not containing NiO produces chips at a rate of 19/100K samples, while the samples respectively using the ceramic slurry containing 0.05% by weight of NiO and the ceramic slurry containing 0.10% by weight of NiO produce no chips.

Furthermore, a section of the monolithic ceramic capacitor of each of the samples obtained described above was observed using a scanning electron microscope. As a result, it was seen that the crystal grain size decreased in the sample using the ceramic slurry not containing the NiO powder, and it was thus recognized that the sintering was insufficient. However, in each of the samples respectively using the ceramic slurry containing 0.05% by weight of NiO power and the ceramic slurry containing 0.10% by weight of NiO powder, the crystal grain size was uniform from the vicinity of the internal electrodes to the surface of the laminate. It was thus recognized that sufficient sintering proceeded over the entire region of the laminate.

Experimental Example 3

A ceramic slurry not containing a NiO powder and a ceramic slurry containing 0.10% by weight of NiO powder based on a ceramic power were prepared in the same manner as Experimental Example 1.

Next, ceramic green sheets were prepared by using each of the ceramic slurries, and an internal electrode containing nickel was formed on each of the specified ceramic green sheets. Then, the ceramic green sheets were laminated to obtain a green laminate, and the resultant green laminate was burned. Next, external electrodes were formed on the laminate to prepare a monolithic ceramic capacitor having the outside dimensions of 1.25 mm×1.25 mm×2.0 mm, and each of ceramic layers between the respective internal electrodes had a thickness of 10 $\mu$m.

The insulating resistance of the monolithic ceramic capacitor of each of the samples was measured to determine the ratio of insulating resistance defects. The obtained results are shown in Table 2.

TABLE 2

| Adding amount of NiO (% by weight) | Occurrence ratio of insulating resistance defects (1) | Occurrence ratio of insulating resistance defects (2) |
|---|---|---|
| 0 | 1376 ppm | 122 ppm |
| 0.10 | 13 ppm | 0 ppm |

In Table 2, "Occurrence ratio of insulating resistance defects (1)" shows the ratio of the number of samples producing insulating resistance defects per 200,000 samples. "Occurrence ratio of insulating resistance defects (2)" shows the ratio of the number of samples producing insulating resistance defects in a second measurement of insulating resistance of samples which had been decided as good samples in the first measurement of insulating resistance.

Table 2 indicates that the sample using the ceramic slurry not containing NiO produces many defects of insulating resistance, while the sample using the ceramic slurry containing 0.10% by weight of NiO shows an occurrence ratio of insulating resistance defects (1) of as low as 18 ppm, and an occurrence ratio of insulating resistance defects (2) of 0 ppm, i.e., no insulating resistance defect.

These results reveal that the occurrence of insulating resistance defects can be effectively prevented by adding NiO, and it is thus thought that the occurrence of micropeeling between the internal electrodes and the ceramic layers can be effectively prevented.

Experimental Example 4

A ceramic slurry not containing a NiO powder, a ceramic slurry containing 0.05% by weight of NiO powder based on a ceramic power, and a ceramic slurry containing 0.10% by weight of NiO powder based on a ceramic power were prepared in the same manner as Experimental Example 1.

Next, a monolithic ceramic capacitor was prepared by using each of the ceramic slurries in the same manner as Experimental Example 3.

The capacitance, dielectric loss DF (Dissipation Factor), insulating resistance (log IR), dielectric breakdown voltage, and temperature characteristic of capacitance of the monolithic ceramic capacitor of each of the samples were measured. The obtained results are shown in Table 3.

TABLE 3

| Adding amount of NiO (% by weight) | | 0 | 0.05 | 0.10 |
|---|---|---|---|---|
| Capacitance (nF), n = 30 | Average | 1462 | 1467 | 1434 |
| | Maximum | 1545 | 1522 | 1475 |
| | Minimum | 1399 | 1409 | 1397 |
| Dielectric loss DF (%), n = 30 | Average | 4.68 | 4.73 | 4.58 |
| | Maximum | 4.98 | 4.94 | 4.84 |
| Insulating resistance (log IR), n = 30 | Average | 10.40 | 10.55 | 10.37 |
| | Minimum | 9.91 | 9.71 | 9.90 |
| Dielectric breakdown voltage (V), n = 10 | Average | 547 | 562 | 546 |
| | Minimum | 513 | 544 | 528 |
| Temperature characteristic (%) at +20° C. as reference, n = 3 | −40° C. | −53.3 | −51.9 | −55.6 |
| | Maximum | +22.7 | +23.1 | +22.6 |
| | +85° C. | −78.9 | −78.6 | −79.1 |

The numerical value of each the characteristics shown in Table 3 is based on only samples decided as good products.

In Table 3, a comparison between the samples containing 0% by weight of NiO, 0.05% by weight of NiO and 0.0% by weight of NiO indicates that each of the electrical characteristics is not deteriorated by adding NiO. In order to ensure this, the NiO concentration between the internal electrodes and the NiO concentration at each end of the laminate in the width direction, in which the internal electrode was not formed, for each of the samples containing 0% by weight of NiO and 0.10% by weight of NiO were determined by a wavelength dispersive X-ray microanalyzer. The obtained results are shown in Table 4.

TABLE 4

|  |  | NiO concentration (% by weight) |
|---|---|---|
| No addition of NiO | Between internal electrodes | 0.9 |
|  | Both ends in the width direction | 0.1 |
| Addition of 0.10% by weight of NiO | Between internal electrodes | 0.9 |
|  | Both ends in the width direction | 0.2 |

Table 4 indicates that even when the sample not containing nickel, i.e., the sample of "No addition of NiO", was used for the ceramic green sheets for the ceramic layers, a large amount of NiO diffuses and dissolves between the internal electrodes in the monolithic ceramic capacitor. On the other hand, even when the sample containing NiO, i.e., the sample of "Addition of 0.10% by weight of NiO", is used for the ceramic green sheets for the ceramic layers, the NiO concentration between the internal electrodes is 0.9% by weight, similar to the sample not containing NiO. Therefore, it is found that addition of about 0.10% by weight of NiO has substantially no effect on the NiO concentration between the internal electrodes, and thus substantially no effect on the electrical characteristics.

Experimental Example 5

A ceramic slurry not containing a NiO powder and a ceramic slurry containing 0.10% by weight of NiO powder based on a ceramic power were prepared in the same manner as Experimental Example 1.

Next, ceramic green sheets were prepared by using each of the ceramic slurries.

Next, (1) a monolithic ceramic capacitor of sample 1 using only the ceramic green sheets containing NiO, (2) a monolithic ceramic capacitor of sample 2 using only the ceramic green sheets not containing NiO, and (3) a monolithic ceramic capacitor of sample 3 using the ceramic green sheets containing NiO for the external layers, and the ceramic green sheets not containing NiO for the intermediate portion, where the internal electrodes are provided, were prepared.

The monolithic ceramic capacitor of each of samples 1, 2 and 3 comprised the internal electrodes containing nickel, and had the outside dimensions of 0.5 mm×0.5 mm×1.0 mm, the thickness of ceramic layers between the respective internal electrodes was 8 μm, and the internal electrodes had the planar dimension of 0.3 mm×0.7 mm.

For the monolithic ceramic capacitors of examples 1, 2 and 3, "Occurrence ratio of chips" was measured by the same method as Experimental Example 2, and "Occurrence ratio of insulating resistance defects (1)" and "Occurrence ratio of insulating resistance defects (2)" were measured by the same method as Experimental Example 3. The results are shown in Table 5.

TABLE 5

| Sample No. | Occurrence ratio of chip (/100K) | Occurrence ratio of insulating resistance defects (1) | Occurrence ratio of insulating resistance defects (2) |
|---|---|---|---|
| 1 | 0 | 13 ppm | 0 ppm |
| 2 | 19 | 1376 ppm | 122 ppm |
| 3 | 0 | 20 ppm | 0 ppm |

Table 5 indicates that with the internal electrodes having a side margin of as small as about 100 μm, the monolithic ceramic capacitor of sample 3 formed by using the ceramic green sheets containing NiO for the external layers and the ceramic green sheets not containing NiO for the intermediate portion, in which the internal electrodes are provided, exhibits substantially the same effect as the monolithic ceramic capacitor of sample 1 formed by using only the ceramic green sheets containing NiO.

Although the present invention is mainly described with respect to the monolithic ceramic capacitor, the present invention can also be applied to monolithic ceramic electronic parts other than the monolithic ceramic capacitor, for example, a monolithic ceramic inductor, a monolithic LC composite part, a monolithic ceramic varistor, a multilayer ceramic substrate, etc.

In the embodiments illustrated, the internal electrodes serving as the internal conductor films contain nickel as the conductive metal component, and nickel oxide, i.e., NiO, is contained in ceramic green sheets. However, in other embodiments of the present invention, a conductive metal component other than nickel may be contained in the internal conductor films, and an oxide of the conductive metal component other than nickel may be contained in the ceramic green sheets.

As described above, an oxide of a conductive metal component contained in an internal conductor film is contained in each of ceramic green sheets used for ceramic layers for at least external layers provided to a laminate of a monolithic ceramic capacitor in the present invention, and even when the conductive metal component diffuses and dissolves from the internal conductor films in the burning step, non-uniformity in the concentration of the oxide of the conductive metal component can be suppressed, thereby achieving a sufficient uniform sintered state over the whole of the laminate.

Therefore, the occurrence of structural defects such as delamination and micropeeling between the internal conductor films and the ceramic layers can be decreased in the obtained monolithic ceramic electronic part, and the occurrence of defects, for example, a chip, in the appearance of a laminate or outer electrodes can also be decreased.

When the content of the oxide of the conductive metal component contained in the ceramic green sheets is limited in the range of about 0.05% to 0.2% by weight based on the ceramic powder contained in the ceramic green sheets, the effect of the oxide of the conductive metal component can be sufficiently exhibited while securely preventing an adverse effect on the electrical characteristics of the resultant monolithic ceramic electronic part.

In order to prepare the ceramic green sheets, the step of preparing a ceramic raw material, the step of calcining the ceramic raw material to obtain a ceramic powder, the step of dispersing the ceramic powder in an organic vehicle to prepare ceramic slurry, and the step of forming the ceramic slurry in a sheet to prepare the ceramic green sheets are performed. When the oxide of the conductive metal component is added in the step of preparing the ceramic slurry, the concentration of the oxide of the conductive metal component can be easily controlled at any time according to the thickness of the ceramic layers obtained. Furthermore, an effect similar to diffusion and dissolution from the internal conductor films can be expected from the oxide of the conductive metal component, and the effect of facilitating uniform dispersion of the oxide of the conductive metal component is exhibited.

What is claimed is:

1. A method of manufacturing a monolithic ceramic electronic part comprising a laminate comprising a plurality of laminated ceramic layers and a plurality of internal conductor films respectively extending along the interfaces between the ceramic layers positioned in an intermediate portion in the lamination direction, the method comprising:

providing a plurality of ceramic green sheets each comprising a ceramic powder and used for forming a ceramic layer by burning having an internal conductor film comprising a conductive metal component thereon and a plurality of ceramic green sheets without an internal conductor film the thereon;

laminating a plurality of ceramic green sheets on which internal conductor films are respectively formed, and laminating ceramic green sheets without the internal conductor films as external laminate layers in the lamination direction, to form a green laminate; and burning the green laminate;

wherein each of the ceramic green sheets used as the external layers comprise an oxide of the conductive metal component contained in the internal conductor films, and wherein the oxide of the conductive metal component is present prior to burning only in the ceramic green sheets used as the external layers.

2. A method of manufacturing a monolithic ceramic electronic part according to claim 1, wherein the concentration of the oxide of the conductive metal component in each of the ceramic green sheets is about 0.05% to 0.2% by weight based on the ceramic powder contained in each of the ceramic green sheets.

3. A method of manufacturing a monolithic ceramic electronic part according to claim 2, further comprising preparing the ceramic green sheets by a method which comprises preparing a ceramic raw material, burning the ceramic raw material to obtain a ceramic powder, dispersing the ceramic powder in an organic vehicle to produce ceramic slurry, and forming the ceramic slurry in a sheet to prepare the ceramic green sheets, wherein the oxide of the conductive metal component is added to the ceramic green sheets when preparing the ceramic slurry.

4. A method of manufacturing a monolithic ceramic electronic part according to claim 3, wherein the conductive metal is nickel and the oxide of the conductive metal component comprises a nickel oxide.

5. A method of manufacturing a monolithic ceramic electronic part according to claim 1, wherein the conductive metal is a base metal.

6. A method of manufacturing a monolithic ceramic electronic part according to claim 5, wherein the conductive metal is nickel and the oxide of the conductive metal component comprises a nickel oxide.

7. A monolithic ceramic electronic part manufactured by a manufacturing method according to claim 1.

8. A monolithic ceramic electronic part according to claim 7, wherein the monolithic ceramic electronic part is a monolithic ceramic capacitor having internal electrodes comprising internal conductive films formed in the laminate except at both ends of the laminate in the width direction and at both ends of laminate in the lamination direction, and having a pair of external electrodes formed on different outer surface of the laminate so each external electrode is connected to a different internal electrode.

9. A monolithic ceramic electronic part manufactured by a manufacturing method according to claim 2.

10. A monolithic ceramic electronic part according to claim 9 wherein the monolithic ceramic electronic part is a monolithic ceramic capacitor having internal electrodes comprising internal conductive films formed in the laminate except at both ends of the laminate in the width direction and at both ends of the laminate in the lamination direction, and having a pair of external electrodes formed on different outer surface of the laminate so each external electrode is connected to a different internal electrode.

11. A monolithic ceramic electronic part manufactured by a manufacturing method according to claim 5.

12. A monolithic ceramic electronic part according to claim 11 wherein the monolithic ceramic electronic part is a monolithic ceramic capacitor having internal electrodes comprising internal conductive films formed in the laminate except at both ends of the laminate in the width direction and at both ends of the laminate in the lamination direction, and having a pair of external electrodes formed on different outer surface of the laminate so each external electrode is connected to a different internal electrode.

* * * * *